US007110989B2

(12) United States Patent
Iemoto et al.

(10) Patent No.: US 7,110,989 B2
(45) Date of Patent: Sep. 19, 2006

(54) COMPUTER-ASSISTED EDUCATION APPARATUS AND METHOD FOR ADAPTIVELY DETERMINING PRESENTATION PATTERN OF TEACHING MATERIALS

(75) Inventors: Osamu Iemoto, c/o Fujitsu Limited 1-1, Kamikodanaka 4-chome, nakahara-ku, Kawasaki-shi, Kanagawa, 211-8588 (JP); Syoichi Endo, Kawasaki (JP)

(73) Assignees: Fujitsu Limited, Kawasaki (JP); Osamu Iemoto, Osaka (JP)

( * ) Notice: Subject to any disclaimer, the term of this patent is extended or adjusted under 35 U.S.C. 154(b) by 445 days.

(21) Appl. No.: 09/866,647

(22) Filed: May 30, 2001

(65) Prior Publication Data

US 2002/0120593 A1    Aug. 29, 2002

(30) Foreign Application Priority Data

Dec. 27, 2000    (JP)    ............................. 2000-398404

(51) Int. Cl.
*G06F 15/18* (2006.01)
(52) U.S. Cl. ............................. 706/14; 706/12; 706/46
(58) Field of Classification Search ................. 706/16, 706/14, 12; 434/118, 169, 362, 322–3; 705/26
See application file for complete search history.

(56) References Cited

U.S. PATENT DOCUMENTS

| | | | | |
|---|---|---|---|---|
| 5,122,952 A | * | 6/1992 | Minkus | 705/26 |
| 5,227,874 A | * | 7/1993 | Von Kohorn | 705/10 |
| 5,537,618 A | * | 7/1996 | Boulton et al. | 345/745 |
| 5,788,655 A | * | 8/1998 | Yoshimura et al. | 600/587 |
| 5,810,605 A | * | 9/1998 | Siefert | 434/362 |
| 5,904,485 A | * | 5/1999 | Siefert | 434/322 |
| 6,032,129 A | * | 2/2000 | Greef et al. | 705/27 |
| 6,160,987 A | * | 12/2000 | Ho et al. | 434/350 |
| 6,206,700 B1 | * | 3/2001 | Brown et al. | 434/116 |
| 6,226,627 B1 | * | 5/2001 | Polak | 706/14 |

(Continued)

FOREIGN PATENT DOCUMENTS

EP    710942 A2 *    5/1996

(Continued)

OTHER PUBLICATIONS

André et al; Integrating Models of Personality and Emotions into Lifelike Characters; Proceedings of the workshop on Affect in Interactions-Towards a new Generation of Interfaces in conjunction with the 3rd i3 Annual Conference; Oct. 1999; pp. 136-149.*

(Continued)

*Primary Examiner*—Joseph P. Hirl
(74) *Attorney, Agent, or Firm*—Staas & Halsey LLP

(57) ABSTRACT

The invention relates to determination of a presentation pattern of a teaching material in a computer-assisted education system. An information processing apparatus includes first processor means for analyzing an answer from a user to determine a trait of the user related to a personality, and for determining a teaching material presentation pattern for the user in accordance with the trait of the user. Second processor means is provided for selecting and editing ones of a plurality of teaching material elements of a specific subject in accordance with the presentation pattern, generating a teaching material module, and presenting the teaching material module to the user in accordance with the presentation pattern. Third processor means is provided for analyzing learning behavior of the user during learning of the user using the presented teaching material module in accordance with the presentation pattern, and modifying the presentation pattern in accordance with the analysis.

27 Claims, 9 Drawing Sheets

U.S. PATENT DOCUMENTS

| | | | |
|---|---|---|---|
| 6,236,955 B1 * | 5/2001 | Summers | 703/6 |
| 6,334,779 B1 | 1/2002 | Siefert | |
| 6,386,883 B1 * | 5/2002 | Siefert | 434/322 |
| 6,401,094 B1 * | 6/2002 | Stemp et al. | 707/10 |
| 2001/0055749 A1 * | 12/2001 | Siefert | 434/322 |
| 2002/0113809 A1 * | 8/2002 | Akazawa et al. | 345/706 |

FOREIGN PATENT DOCUMENTS

| | | | |
|---|---|---|---|
| EP | 710943 A2 * | 5/1996 | |
| EP | 913798 A2 * | 5/1999 | |
| JP | 08227265 A * | 9/1996 | |
| JP | 08227266 A * | 9/1996 | |

OTHER PUBLICATIONS

Ostman; Synthetic Sentience on Demand; 1997; pp. 1-17; http://project.cyberpunk.ru/idb/synthetic_sentience.html.*

Homer; A neural network model of personality; IEEE International Joint Conference on Neural Networks; vol. 1; Jul. 10-16, 1999; pp. 103-108.*

Patent Abstracts of Japan of JP 10-333538 dated Dec. 18, 1998.

Patent Abstracts of Japan of JP 8-328939 dated Dec. 13, 1996.

A Factorial Study of the Temperament of Japanese College Male Students by The Yatabe-Guilford Personality Inventory.

* cited by examiner

COMPUTER-ASSISTED EDUCATION APPARATUS AND METHOD FOR ADAPTIVELY DETERMINING PRESENTATION PATTERN OF TEACHING MATERIALS

FIELD OF THE INVENTION

The present invention relates to determination of a presentation pattern of a teaching material for each learner in a computer-assisted education system.

BACKGROUND OF THE INVENTION

Recently, many people in Japan have recognized that it is desirable to educate individual students in accordance with different education programs adapted to the respective students. For this purpose, a lot of human resources must be concentrated on the preparation of many different teaching materials. In addition, at least one teacher must be assigned to each group of students of the same education program. In a certain case, one teacher must be assigned to one student. However, such education programs require a high cost and a long preparation time.

On the other hand, a computer-assisted education system is known. An example of such a system is disclosed by David M. Siefert in Japanese Unexamined Patent Publication No. HEI 8-227265 A laid open for public inspection on Sep. 3, 1996, entitled "Computer-Assisted Education System", which claims convention priority of U.S. patent application Ser. Nos. 334,775, 334,778 and 334,780, which were filed on Nov. 4, 1994. In this publication, an exemplary system includes a computer storing a plurality of education programs for presenting subject materials to a student, and communicator means for allowing the student to select and execute the program. Another exemplary system includes administrator means capable of determining whether a student understands a presented educational material, means for generating a profile describing the learning characteristics of the student, and means for storing the profile in the system. The profile is generated based on a test result of the student, a result of a personal interview, and evaluation of the student for an assigned task. Presentation of a lesson to each student can be adjusted according to the profile of the student. The profile contains assessment by an educational psychology test conducted before learning, and a preferred learning style is determined based on the assessment. Furthermore, the learning style is modified based on the student's grasp and learning speed. In this system, it is necessary to prepare some learning styles before the learning.

In this system, however, while the educational material is being presented to the student, learning behavior of the student is not monitored to modify the learning style of subsequent educational materials in response to the monitored learning behavior.

In the Japanese Unexamined Patent Publication No. HEI 10-333538 A laid open for public inspection on Dec. 18, 1998, T. Wadahama et al. disclosed the "Network Type Education System, Recording Medium Recording Instructor Program of Network Type Education System, and Recording Medium Recording Participant Program". According to this system in this publication, when questionnaire execution means provides a questionnaire for determining the understanding degree of a lecture for each participant, questionnaire responding means in each terminal device of the participant responds to the questionnaire in accordance with the keyboard operation or the like by the participant. Understanding degree data display means of the terminal device of an instructor aggregates answers of the questionnaires from the participants, and displays the number of participants for each understanding degree on a monitor. Review material presentation means presents a review material corresponding to the understanding degree of each participant.

In this system, however, learning behavior of the participant is not monitored while the teaching material is being presented to the participants.

The inventors have recognized that the learning efficiency can be improved in the computer-assisted education system, by determining a presentation pattern of a teaching material for each learner adaptively in accordance with a personality trait of the learner, and by dynamically or adaptively changing, in response to current learning behavior of the learner, the presentation pattern of teaching materials or video clips for the learner.

An object of the present invention is to determine a presentation pattern of a teaching material that is adapted to a personality trait of a learner in a computer-assisted education system.

Another object of the present invention is to select and edit a teaching material in accordance with the presentation pattern of a teaching material in the computer-assisted education system.

A further object of the present invention is to change the presentation pattern of a teaching material in response to learning behavior of the learner in the computer-assisted education system.

SUMMARY OF THE INVENTION

In accordance with one aspect of the present invention, an information processing apparatus includes a memory having a first memory area for storing a plurality of teaching material elements including text, video and/or audio data, and having a second memory area for storing teaching material presentation patterns. First processor means is provided for providing a questionnaire to a user and analyzing an answer to the questionnaire to determine a trait of the user related to personality, and for determining a teaching material presentation pattern for the user in accordance with the determined trait of the user to store the determined teaching material presentation pattern in the second memory area. Second processor means is provided for retrieving the teaching material presentation pattern for the user from the second memory area, selecting and editing ones of a plurality of teaching material elements of a specific subject in the first memory area in accordance with the teaching material presentation pattern to generate a teaching material module, and presenting the teaching material module to the user in accordance with the teaching material presentation pattern. Third processor means is provided for analyzing learning behavior of the user during a learning process of the user using the presented teaching material module in accordance with the teaching material presentation pattern, modifying the teaching material presentation pattern in accordance with the analysis, and storing the modified presentation pattern in the second memory area.

In accordance with another aspect of the invention, a program stored in a recording medium is for use with an information processing apparatus. The information processing apparatus includes a memory and a processor. The memory has a first memory area for storing a plurality of teaching material elements including text, video and/or audio data, and has a second memory area for storing a teaching material presentation pattern. The program enables the processor to perform the step of providing a questionnaire to a user and analyzing an answer to the questionnaire to determine a trait of the user related to personality, the step of determining a teaching material presentation pattern for the user in accordance with the determined trait of the user to store the determined teaching material presentation pattern in the second memory area, the step of retrieving the teaching material presentation pattern for the user from the second memory area, selecting and editing ones of a plurality of teaching material elements of a specific subject in the first memory area in accordance with the teaching material presentation pattern to generate a teaching material module, and presenting the teaching material module to the user in accordance with the teaching material presentation pattern, and the step of analyzing learning behavior of the user during a learning process of the user using the presented teaching material module in accordance with the teaching material presentation pattern, modifying the teaching material presentation pattern in accordance with the analysis, and storing the modified presentation pattern in the second memory area.

In accordance with a further aspect of the invention, a method for adaptively presenting to a user a teaching material is used in a computer-assisted education system which presents to the user a plurality of teaching material elements including text, video, and/or audio data. The method comprising the step of providing a questionnaire to a user and analyzing an answer to the questionnaire to determine a trait of the user related to personality, the step of determining a teaching material presentation pattern for the user in accordance with the trait of the user, the step of selecting and editing ones of a plurality of teaching material elements of a specific subject in accordance with the teaching material presentation pattern for the user to generate a teaching material module, and presenting the teaching material module to the user in accordance with the teaching material presentation pattern, and the step of analyzing learning behavior of the user during a learning process of the user using the presented teaching material module, and modifying the teaching material presentation pattern in accordance with the analysis.

According to the invention, the teaching material can be selected and edited in accordance with the presentation pattern of the teaching material adapted to the trait of the learner, and the presentation pattern of the teaching material can be modified in response to the learning behavior of the learner.

DESCRIPTION OF THE PREFERRED EMBODIMENTS

Figure 1:
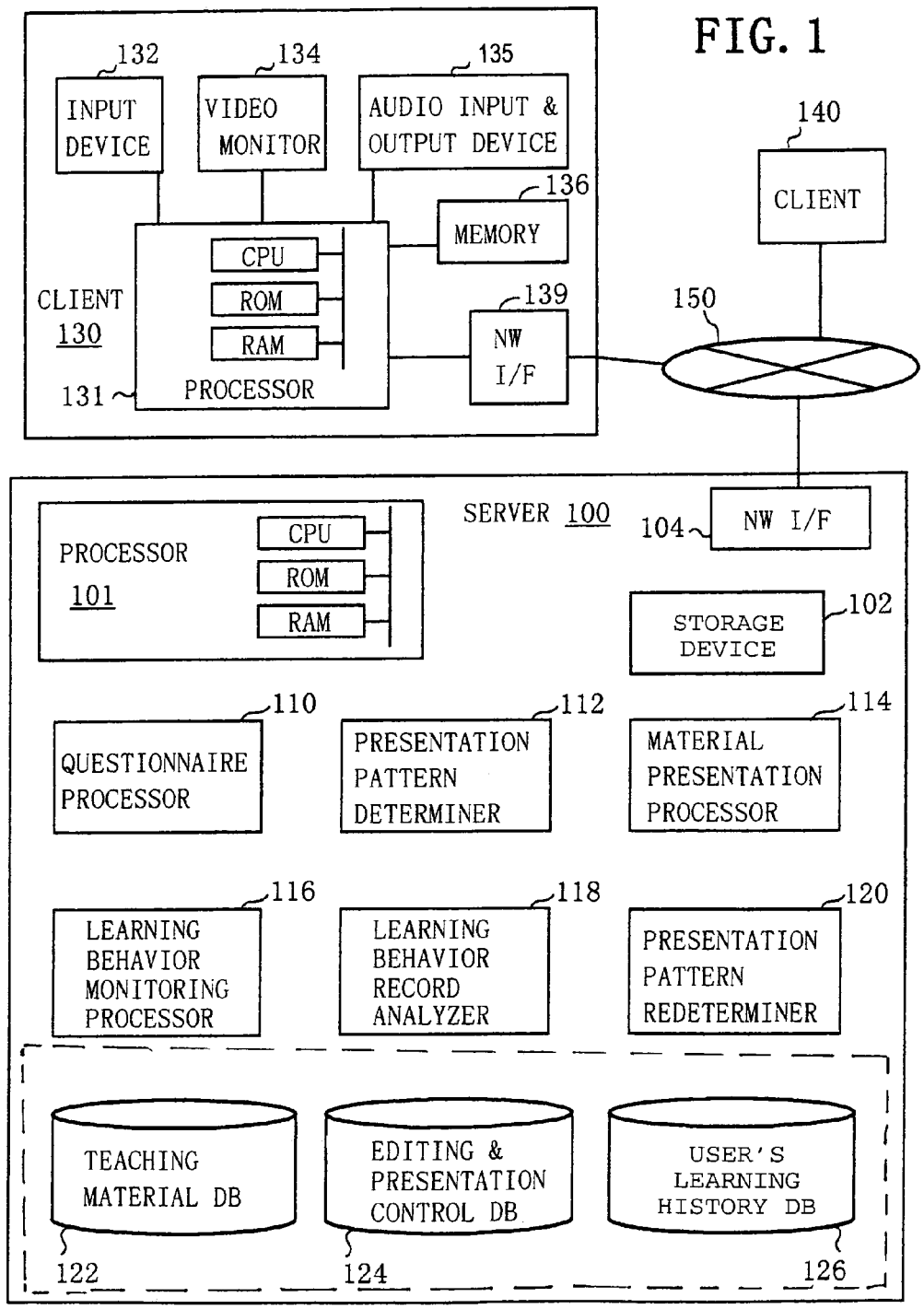
FIG. 1 shows a configuration of a computer-assisted education system including a server machine and client machines interconnected via a network, in accordance with an embodiment of the present invention.

FIG. 1 shows a configuration of a computer-assisted education system including a server machine 100, client machines 130 and 140 interconnected via a network 150 such as Internet, a telephone network, a local area network (LAN) and the like, in accordance with an embodiment of the present invention.

Referring to FIG. 1, the configuration of the apparatus of the server machine 100 (hereinafter also referred to as a server) is described below. The server machine 100 typically includes a processor 101, a storage device 102 such as a magnetic disk, other storage devices for databases described below, a network interface 104, a video monitor (not shown), a keyboard (not shown), an the like. The processor 101 typically includes a CPU, a ROM, and a RAM.

The server 100 has a plurality of server functions that are implemented as application programs stored in the storage device 102 executed by the processor 101. The server functions may also include a Web server function and a virtual world server function. The server 100 further includes a questionnaire processor 110 and a teaching material presentation pattern determiner 112 used before presenting a teaching material, as additional server functions. The server 100 further includes a teaching material presentation processor 114, a learning behavior monitoring processor 116, a learning behavior record analyzer 118, and a teaching material presentation pattern redeterminer 120, for supporting a learning process as additional server functions. Alternatively, these functions of the units 110 to 120 may be implemented as application programs stored in the storage device 102 that are executed by the processor 101.

The server 100 further includes a teaching material database 122, a teaching material editing and presentation control database 124 and a user's learning history database 126.

The teaching material database 122 includes a plurality of teaching materials in the form of video clips. The video clips include teaching materials of different levels in difficulty and depth in expertise for the same subject and teaching materials of different representations for the same subject. The video clips include text, video, and audio data streams. The video clip may also have a definition file of a three-dimensional virtual world described in the Virtual Reality Modeling Language (VRML).

The teaching material editing and presentation control database 124 stores descriptions of a procedure for selecting and editing a teaching material, and of a procedure for controlling presentation of the teaching material that is performed by the teaching material presentation processor 114 in accordance with a teaching material presentation pattern.

The user's learning history database 126 stores a course to be taken by a user and registered in advance, a determined teaching material presentation pattern, a record of a learning behavior, a determined trait of a learning attitude, a test score, and the like.

The teaching material presentation processor 114 of the server 100 selects and edits some of the plurality of video clips in the teaching material database 122 to form a teaching material module for each user in accordance with a teaching material presentation pattern of the user determined in connection with FIG. 2 as will be described later in detail, and presents it to the client machine 130 of the user in accordance with the presentation pattern.

The client machine 130 (hereinafter referred to simply as a client) can be an information processing apparatus or terminal such as a desktop or notebook personal computer (PC) including a processor 131, a storage device 136, an input device 132 such as a keyboard, a mouse and the like, a video monitor or a display device 134, an audio input and output device 135 and a network interface 139, which may include a dialer and a modem and the like. A storage device 136 of the client 130 stores a client function program executed by the processor 131.

The server 100 may be connected to the clients 130 and 140 via a bus in a campus or building. Alternatively, the server 100 and the client 130 may be configured as one computer or unit. In this case, the communication lines and the communication protocol used between the server 100 and the client 130 may not be required.

Figure 2:
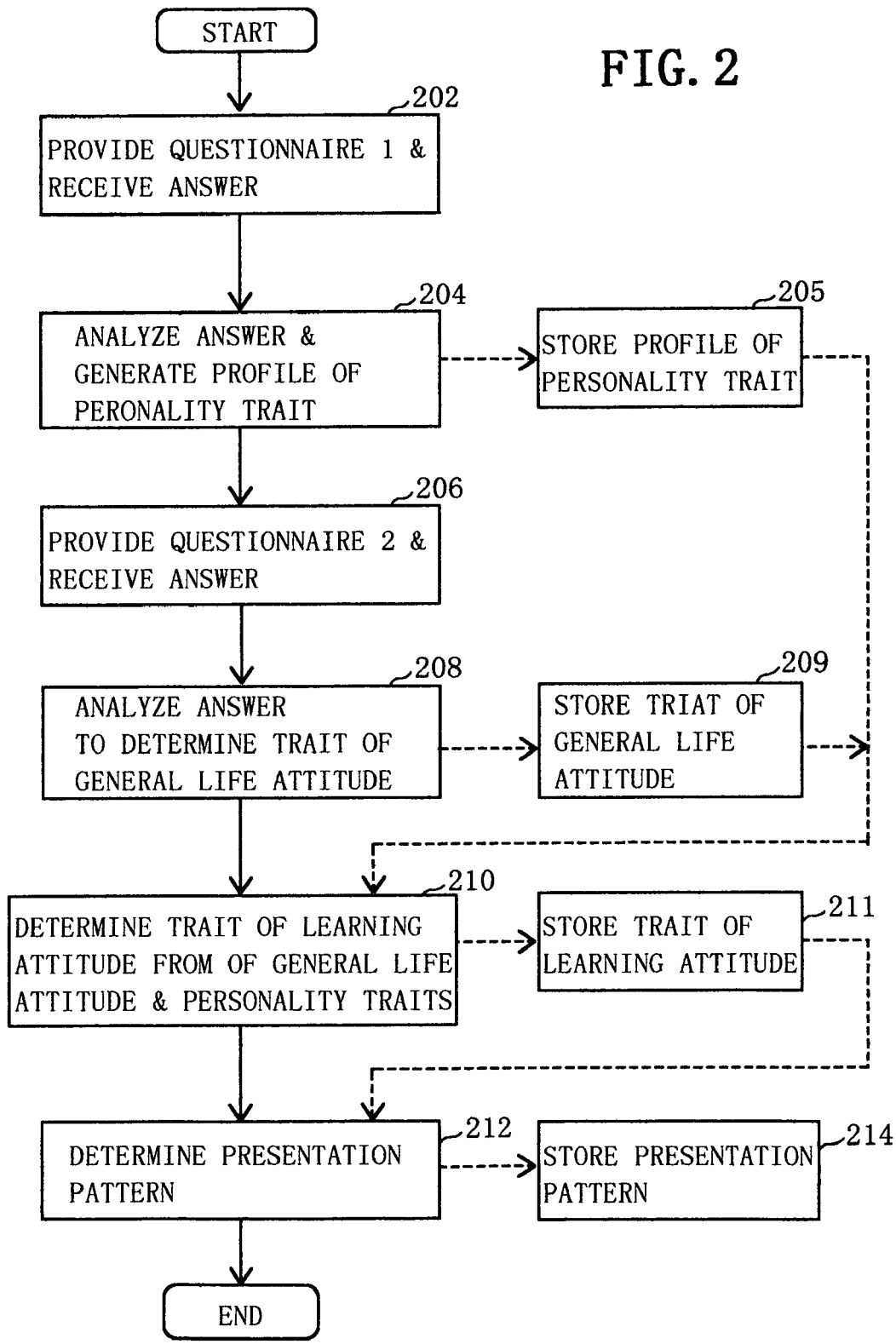
FIG. 2 shows a flowchart for determining a presentation pattern of a teaching material that is performed by a server in the computer-assisted education system, in accordance with the embodiment of the invention.

FIG. 2 shows a flowchart for determining a presentation pattern of a teaching material that is performed by the questionnaire processor 110 and the teaching material presentation pattern determiner 112 of the server 100 in the computer-assisted education system, in accordance with the embodiment of the present invention. In this figure, the solid-line arrows indicate the flow of the main process, and the broken-line arrows indicate the flow of data for storage.

The operations of the server 100 and the client 130 is described below in reference to FIG. 2. When the user selects to execute a questionnaire on a display screen of preparation for the learning (not shown) on the video monitor 134 of the client 130, the server 100 starts to perform the process shown in FIG. 2. At Step 202, the questionnaire for a personality trait test, and the server 100 transmits it to the client 100 and receives answers from the client 130. The client 130 receives the first questionnaire and displays it on the video monitor 134, and instructs the user to operate the input device 132 to answer it. The user of the client 130 of the computer-assisted education system is a learner. The first questionnaire includes a plurality of questions for determining a personality trait of the learner. The personality trait test may be, for example the well known Yatabe-Guilford (Y-G) personality inventory or character test ("Y-G personality trait test").

TABLE 1 specifically shows factors or subjects defining a personality trait, and respective contents of the factors, in accordance with the Y-G personality trait test. In TABLE 1, there are twelve factors: depression (D), cyclic tendency (C), inferiority feelings (I), nervousness (N), lack of objectivity (O), lack of cooperativeness (Co), agressiveness (Ag), general activity (G), rhathycal (R), thinking extraversion (T), ascendancy (A), and social extraversion (S).

TABLE 1

Factors of Personality Trait

| Factors of Personality Trait | Contents |
| --- | --- |
| D (depression) | gloominess, strong sense of sin |
| C (cyclic tendency) | whimsy, easily surprised |
| I (Inferiority feelings) | Lack of confidence, Self-underestimate |
| N (nervousness) | reverie, subjectivism |
| O (lack of objectivity) | Subjectivity, lack of objectivity |
| Co (lack of cooperativeness) | complaining, distrust to others |
| Ag (aggressiveness) | aggressiveness, social activeness |
| G (general activity) | activeness, physical activeness |
| R (rhathymia) | Easy, optimistic, impulsive |
| T (thinking extraversion) | Lack of consideration, meditative, reflective |
| A (ascendancy) | social ascendancy, leadership |
| S (social extraversion) | sociable, social, preference of social contact |

Magnitudes of the factors D to S in TABLE 1 for the user, who is a test subject, are determined from the user's answers to about 120 questions in the questionnaire. From the answers, the magnitudes of the twelve factors D to S of the personality trait for the user are expressed in the percentile or at five levels. The questions for the Y-G personality trait test are, for example, "Do you like to make the acquaintance with many people?", "Do you always keep a low profile in the public?", "Do you like to think of a difficult issue?", and the like. In response to these questions, the user answers with "Yes", "No" and "Undeterminable".

At Step 204, the questionnaire processor 110 analyzes the received answers of the user to determine a percentile profile of the personality trait of the user for the twelve personality trait factors D to S. At Step 205, the questionnaire processor 110 temporarily stores the determined profile in the user's learning history database 126.

At Step 206, the questionnaire processor 110 generates a second questionnaire for a further personality trait test, and the server 100 transmits it to the client 130 and receives the answer from the client 130. The client 130 receives and displays the second questionnaire on the video monitor 134, and instructs the user to operate the input device 132 to answer the questionnaire. The second questionnaire includes a plurality of questions related to attitudes and behaviors in general life for determining a trait or principle of general life attitude of the user. This second test may be related to, for example, seven well-known life attitude principle factors.

TABLE 2 specifically describes seven traits or trait factors of general life attitudes determined by the above mentioned personality trait profile and also by the answers to the second questionnaire related to the general life attitudes and behaviors.

TABLE 2

Traits of General Life Attitudes

| Traits of General Life Attitudes | Contents |
| --- | --- |
| G-A (conformity) | relief by conforming with others' behavior |
| G-B (norm) | consciousness of social norm and morality |
| G-C (impulsiveness) | expectation of novelty, interest in novelty |
| G-D (futurism) | orientation to future rather than past |
| G-E (stability) | preference of stability and pleasure in personal life to a social success |
| G-F (strictness) | efforts, industriousness |
| G-G (justice) | equalitarianism, justice |

The seven traits of general life attitudes and behaviors are G-A (conformity), G-B (norm), G-C (impulsiveness), G-D (futurism), G-E (stability), G-F (strictness), and G-G (justice).

The analysis of the general life attitude trait generates the percentile fitness of the user's general life attitudes and behaviors to the seven traits G-A to G-G shown in TABLE 2. The trait of general life attitude of each user is uniquely determined from the feature of the personality trait profile and the answers to the questionnaire about the general life attitudes and behaviors of the user. However, a certain general life attitude trait may be determined independently of a particular personality trait factor. In other words, the users of the same general life attitude trait may have quite different magnitudes for such a particular personality trait factor.

The user answers the second questionnaire with "Yes", "No" and "Undeterminable" for questions as to whether statements about general life attitudes and behaviors fit the user. The questions about the trait G-A may be "Are you satisfied when you wear clothes similar to the people around you?", "Do you want to have your wedding ceremony and reception at a first-class hotel?", "Are you ashamed of wearing imitation goods?", "Do you want everything done in accordance with precedents?", and the like. The questions about the trait G-B may be "Do you think fathers should have dignity at home?", "Do you think there is a thing that you should not tell others including your closest friend.", and the like. The questions about the trait G-C may be "Do you easily start a new thing, but cannot continue it for a long time?", "Do you often buy things on impulse if they are cheap and good?", and the like. The questions about the trait G-D may be "Do you think what to do in the future is more important than the evaluation in the past?", "Do you take delight in increasing the amount of your deposit?", and the like. The questions about the trait G-E maybe "Do you prefer enjoying your personal life to making a success in life?", "Do you want to increase your income at the cost of your leisure time?", and the like. The questions about the trait G-F may be "Do you have a friend to consult with about everything?", "Do you think it is better to keep your purpose high and do your best in your life?", and the like. The questions about the trait G-G may be "Do you think people of higher and lower abilities should be treated equally in all respects?", "Do you think you want to eliminate unfairness in the society?", and the like.

At Step 208, the questionnaire processor 110 determines a general life attitude trait of the subject user in accordance with his or her personality trait profile and the answers to the second questionnaire, and temporarily stores it in a memory work area or the learning history database 126 at Step 209. The questions in the second questionnaire about the general life attitude and behavior can be reduced into a few of the questions that are associated with the feature of the personality trait profile obtained from the first questionnaire. For example, a person having a high magnitude or tendency of the personality trait factor Co may be given only the questions related to the traits G-A and G-B.

Figure 3:
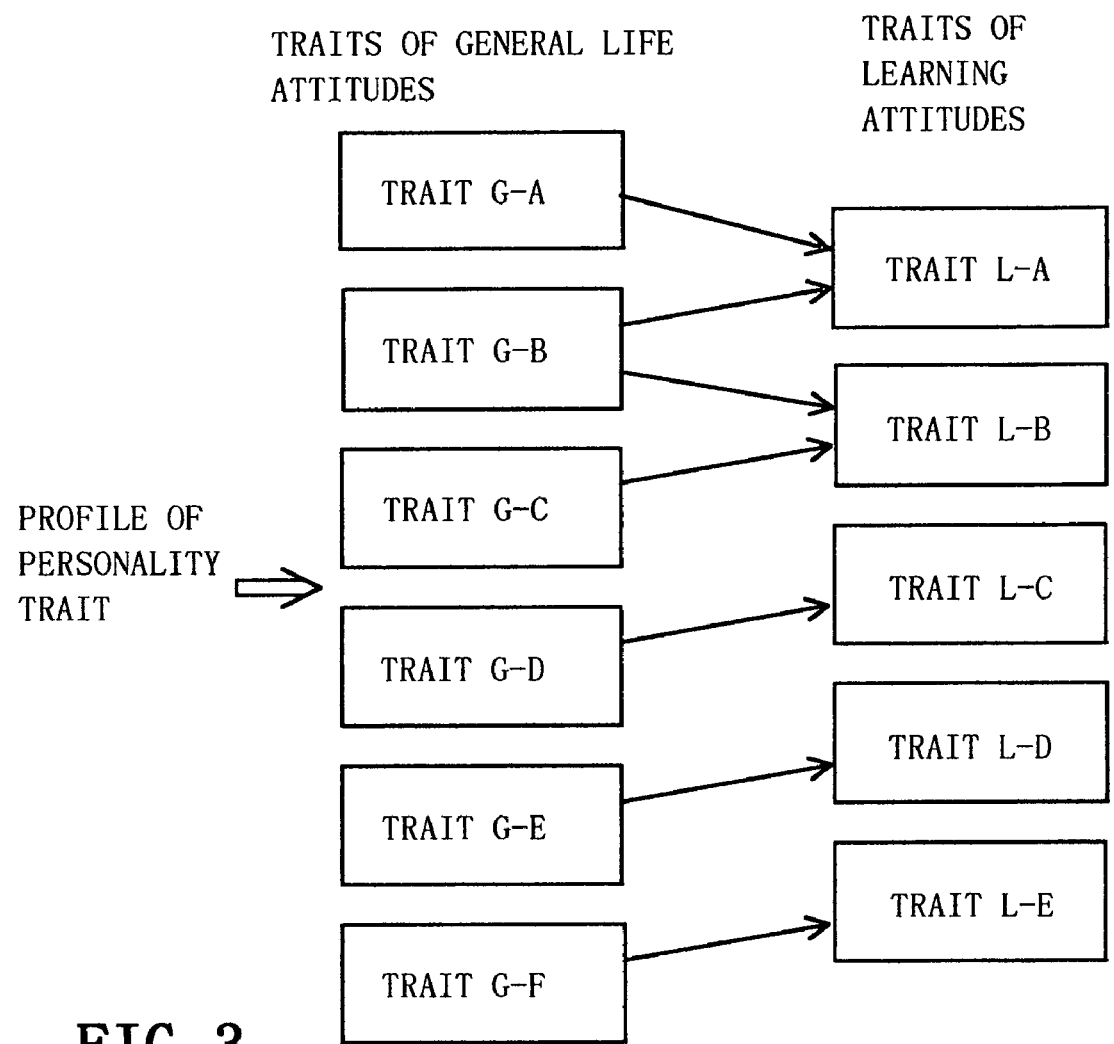
FIG. 3 shows association of personality traits and general life attitude traits of learners with learning attitude traits of the learners.

FIG. 3 shows association of the personality traits and the general life attitude traits G-A to G-F of the learners with five traits L-A to L-E of learning attitudes of the learners. At Step 210, in accordance with the association shown in FIG. 3, the questionnaire processor 110 determines a trait of the learning attitude of the user by mapping one of the general life attitude traits G-A to G-F possibly with reference to the personality trait factors D to S of the user to one of the learning attitude traits L-A to L-E, and stores the determined learning attitude trait at Step 211.

TABLE 3 specifically describes the five traits of learning attitudes described above. The five traits of learning attitudes are a trait L-A (understanding step by step), a trait L-B (understanding outline first), a trait L-C (fast learning), a trait L-D (return to review), and a trait L-E (mixture with random learning), and their contents.

Referring to FIG. 3, a person of the trait G-A has the trait L-A. A person of the trait G-F has the trait L-E. A person of the trait G-D has the trait L-C. A person of the trait G-E has the trait L-D. A person of the trait G-C has the trait L-B. However, a person of a certain general life attitude trait may have different magnitudes for a particular personality trait factor as described above, which magnitudes correspond to either one of a few of the learning attitude traits. For example, a person of the trait G-B with a higher magnitude of the personality trait factor A (ascendancy) is considered to have the trait L-B, but a person having the trait G-B with a lower magnitude of the personality trait factor A (ascendancy) is considered to have the trait L-A

TABLE 3

Traits of Learning Attitudes

| Traits of Learning Attitudes | Contents |
| --- | --- |
| L-A (understanding step by step) | sequential learning on item-by-item basis |
| L-B (understanding outline first) | learning deeper after understanding outline and whole picture |
| L-C (fast learning) | understanding outline, and learning only difficult portions |
| L-D (return to review) | reviewing things remembered while learning |
| L-E (mixture with random learning) | learning at random every interesting portions |

Finally, at Step 212, the presentation pattern determiner 112 determines one of the teaching material presentation patterns that is associated with the determined trait of the user, and stores that presentation pattern in the learning history database 126 at Step 214.

Figure 4:
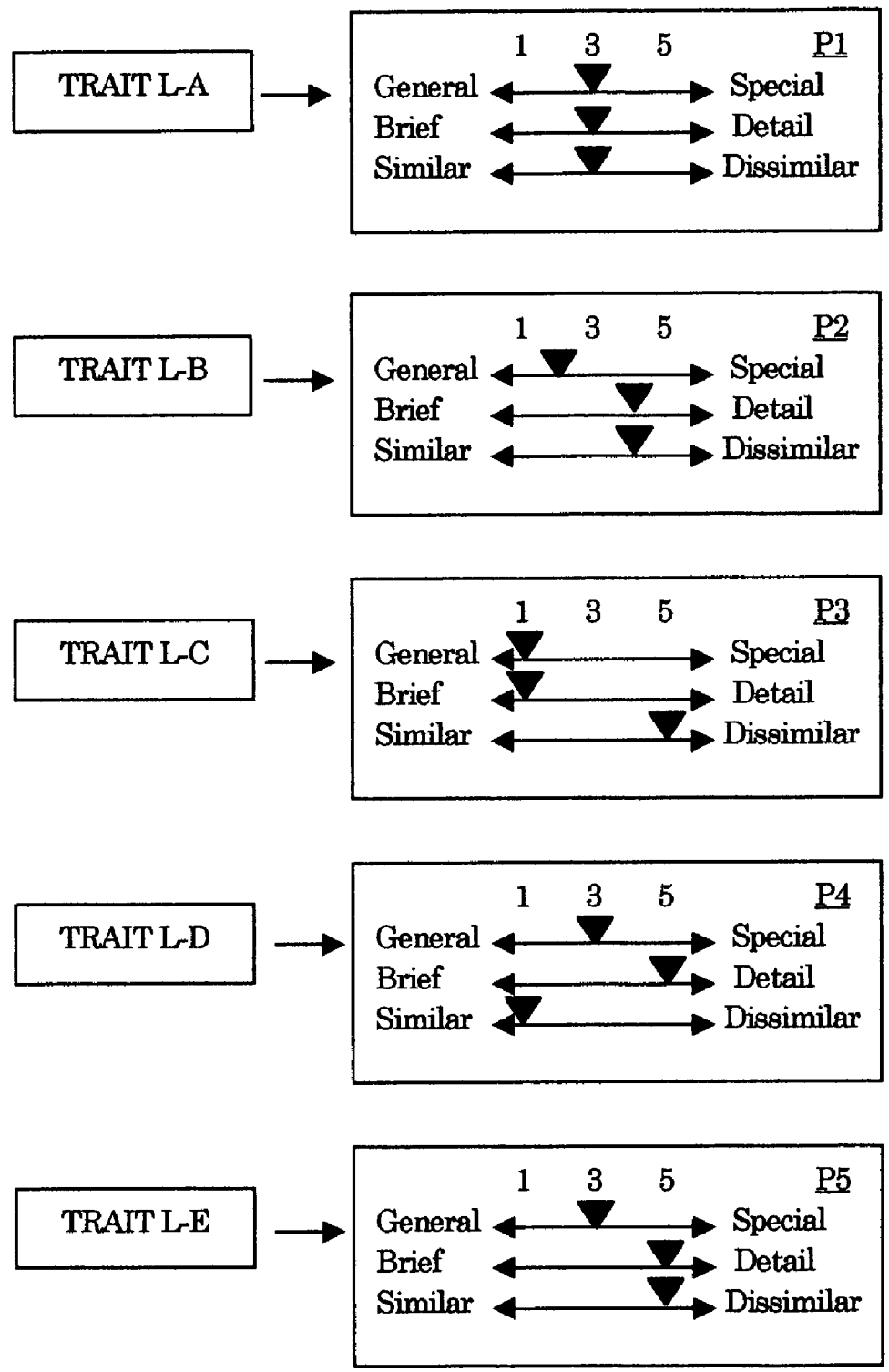
FIG. 4 shows association of a set of learning attitude traits of the learners with a set of presentation patterns of teaching materials, in which each pattern has a scale of difficulty or depth in expertise, a scale of required time, and a scale of dissimilarity among teaching material elements presented for one learning unit.

FIG. 4 shows association of the learning attitude traits L-A to L-E of learners with presentation patterns P1 to P5 of teaching materials, in which each pattern has a scale of difficulty or depth in expertise, a scale of required time, and a scale of dissimilarity among teaching material elements presented for one learning unit. As shown in FIG. 4, each one of the specific presentation patterns P1 to P5 has a scale between "general" and "special" in terms of difficulty or depth in expertise, a scale between "brief" and "detail" in terms of required time, and a scale between "similarity" and "dissimilarity" in terms of dissimilarity among teaching materials presented for one learning unit.

Each scale may be represented by, for example, one of five magnitudes 1, 2, 3, 4 and 5. The magnitude of the general-special scale of "1" indicates that a teaching material to be presented has the most general content. The magnitude of the general-special scale of "5" indicates that a teaching material to be presented has the most special content. The magnitude of the general-special scale of "3" indicates that a teaching material to be presented has the intermediately special content. The magnitude of the brief-detail scale of "1" indicates that a teaching material to be presented requires the shortest time to learn. The magnitude of the brief-detail scale of "5" indicates that a teaching material to be presented requires the longest time to learn. The magnitude of the brief-detail scale of "3" indicates that a teaching material to be presented requires the intermediate time to learn. The magnitude of the similarity-dissimilarity scale of "1" indicates that teaching material elements for the learning unit are the most similar. The magnitude of the similarity-dissimilarity scale of "5" indicates that teaching material elements for the learning unit are the most dissimilar. The magnitude of the similarity-dissimilarity scale of "3" indicates teaching material elements for the learning unit are intermediately similar or dissimilar.

The preparation for the learning of the user is completed when the teaching material presentation pattern is determined. It should be noted that the user selects neither one of his or her personality trait, general life attitude trait, learning attitude trait, and teaching material presentation pattern. That is so because, for example, the user may believe that he or she has a certain personality trait, but the user may actually have a different trait, and a teaching material presentation pattern suitable for the user can be objectively determined in accordance with the traits determined using the questionnaires as described above.

The teaching material database 122 stores a plurality of video clips which are adapted to the respective sets of magnitudes for the three scales. In accordance with the determined teaching material presentation pattern, i.e. the combination of the three magnitudes, several video clips are selected and the order for presenting them is determined to form a teaching material module, and the conditions or restrictions for presenting and developing the video clips or the teaching material module are determined.

After that, using the client 130, the user starts the learning of one chapter, one section, one subsection or one item as a learning unit of a particular subject that requires about a few minutes to a few tens of minutes to learn. A plurality of the learning units may form one lesson or session.

Figure 5:
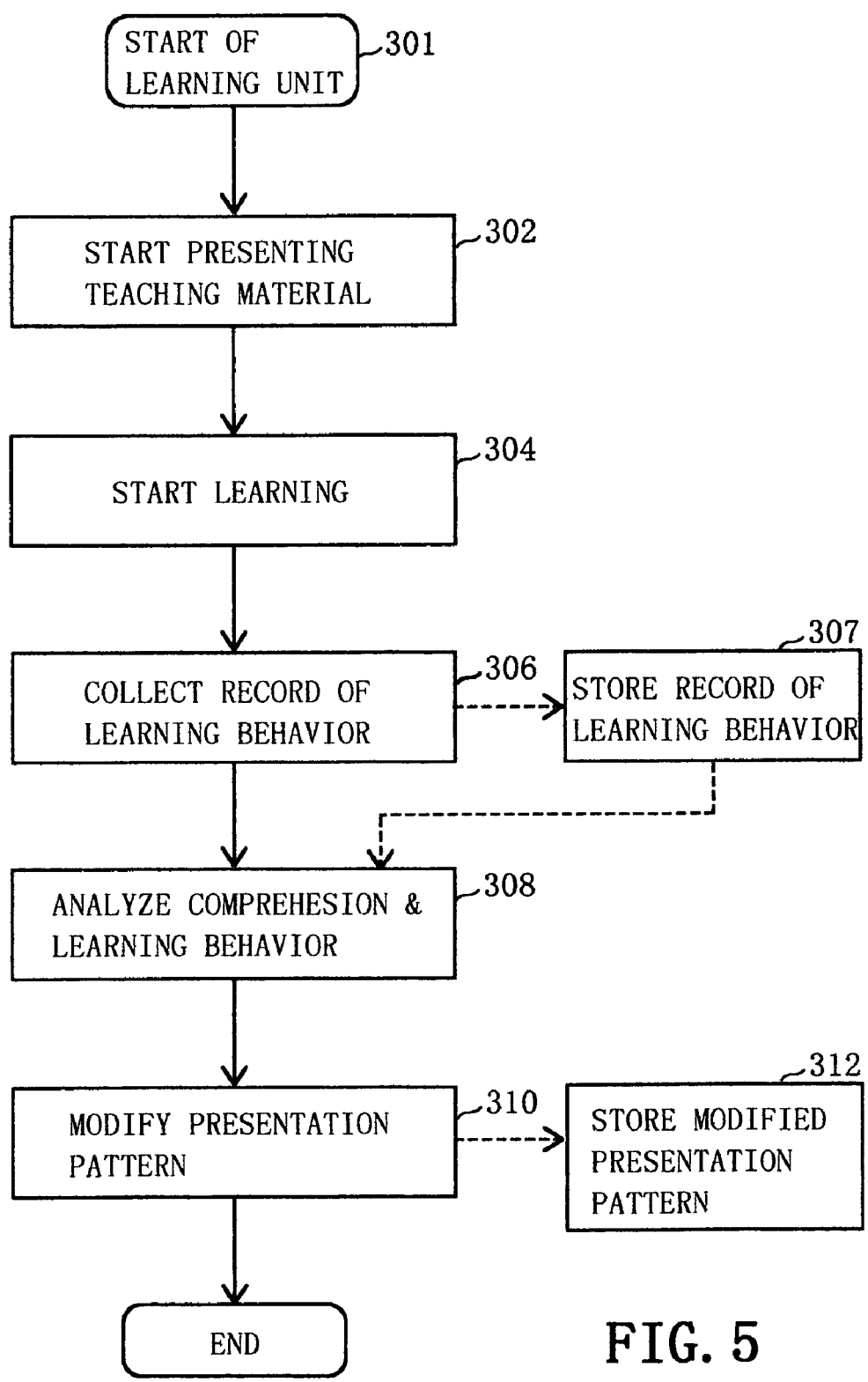
FIG. 5 shows a flowchart for presenting a teaching material and determining a next presentation pattern of a teaching material that is performed by a server, when the learner actually performs a learning process in the computer-assisted education system, in accordance with the embodiment of the invention.

FIG. 5 shows a flowchart for presenting a teaching material and determining a next presentation pattern of a teaching material that is performed by the material presentation processor 114, the learning behavior monitoring processor 116, the learning behavior record analyzer 118 and the presentation pattern redeterminer 120 of the server 100, when the user actually performs the learning process in the computer-assisted education system, in accordance with the embodiment. The flowchart of Steps 301 to 312 provides the user with one learning unit. In this figure, the solid-line arrows indicate the flow of the process, and the broken-line arrows indicate the flow of data for storage.

When the user selects to execute the learning of a specific subject on a display screen of starting the learning (not shown) of the client 130, the learning unit starts at Step 301. At Step 302, the material presentation processor 114 retrieves the teaching material presentation pattern (FIG. 4) of the user from the user's learning history database 126. Then, the material presentation processor 114 retrieves, from the teaching material editing and presentation control database 124, the descriptions of procedures for selecting and editing teaching materials and for controlling the presentation of the teaching materials, which descriptions correspond to the presentation pattern. Then, the material presentation processor 114 selects, in accordance with the teaching material selecting and editing procedures, corresponding ones of the plurality of teaching materials for the learning unit, to edit the selected materials into one teaching material module and present it to the client 130 in accordance with the procedure for controlling the teaching material presentation.

More specifically, the material presentation processor 114 selectively retrieves video clips including text data, image data and/or audio data from the teaching material database 122 in accordance with the "general-special" scale, the "brief-detail" scale and the "similarity-dissimilarity" scale of the presentation pattern as shown in FIG. 4, to edit the selected video clips into one teaching material module and control the presentation order of the video clips, the presentation time of the video clips, the number of the similar or dissimilar video clips to be presented, and the conditions for presenting the video clips. Thus the teaching material module may include voice for explanation, music, images and graphics generated by a computer, captured images, and text for explanation.

At Step 304, the learning process starts, and the user performs the learning via the client 130 interactively with the server 100 by means of the material presentation processor 114.

However, the server 100 may transmit the teaching material module and the control procedure thereof to the client 130 to cause the client 130 to control the presentation order of video clips, the presentation time of video clips, the number of similar or dissimilar video clips to be presented, and the conditions for presenting the video clips in accordance with the procedure. In this case, the user performs the learning process interactively with the client 130.

While the user is in the learning process, the client 130 transmits the input data of the user to the server 100 each time the user operates the input device 132 or at a predetermined time intervals. At Step 306, while the user is in the learning process, the learning behavior monitoring processor 116 analyzes the input data received from the client 130, collects a record of the learning behavior of the user during the learning process, and stores it in the user's learning history database 126 at Step 307. The record of the learning behavior may include time required to understand a matter, the number of times to review a previous matter, the number of times to see the same matter during a predetermined time period, the number of answering questions, order of answering questions, a rate of correct answers, time to think of a matter or time during which no input data occurs, and the like.

At the end of the learning process of the learning unit, the learning behavior record analyzer 118 at Step 308 retrieves the record of the learning behavior of the user from the user's learning history database 126. The learning behavior record analyzer 118 analyzes and classifies the learning behavior of the user for the presented teaching material into a trait of approach or attitude to learning and problem solving in accordance with TABLE 4 as described below. Depending on the trait of approach, the presentation pattern, i.e. the scales of difficulty, required time and dissimilarity of the teaching material, is modified or changed.

TABLE 4 specifically describes a plurality of traits of approaches to learning and problem solving: A-A (patience), A-B (weakness to obstacle), A-C (stop at question), A-D (motivation reduction), A-E (expansion of interest), A-F (develop by novelty), A-G (difficulty in reviewing) and A-O (others), and their contents.

TABLE 4

Traits of Approaches to Learning and Problem Solving

| Traits of Approaches | Contents |
| --- | --- |
| A-A (patience) | never give up, face up to difficulty |
| A-B (weakness to obstacle) | easily give up upon facing obstacle (condition, time, difficulty, hopelessness) |
| A-C (stop at question) | stop when question or problem arises |
| A-D (motivation reduction) | motivation and interest rapidly reduce |
| A-E (expansion of interest) | interest expands and viewpoint diversifies |
| A-F (develop by novelty) | start new things easily |
| A-G (difficulty in reviewing) | no good at repeating the same thing |
| A-O (others) | other than those stated above |

Figure 6A:
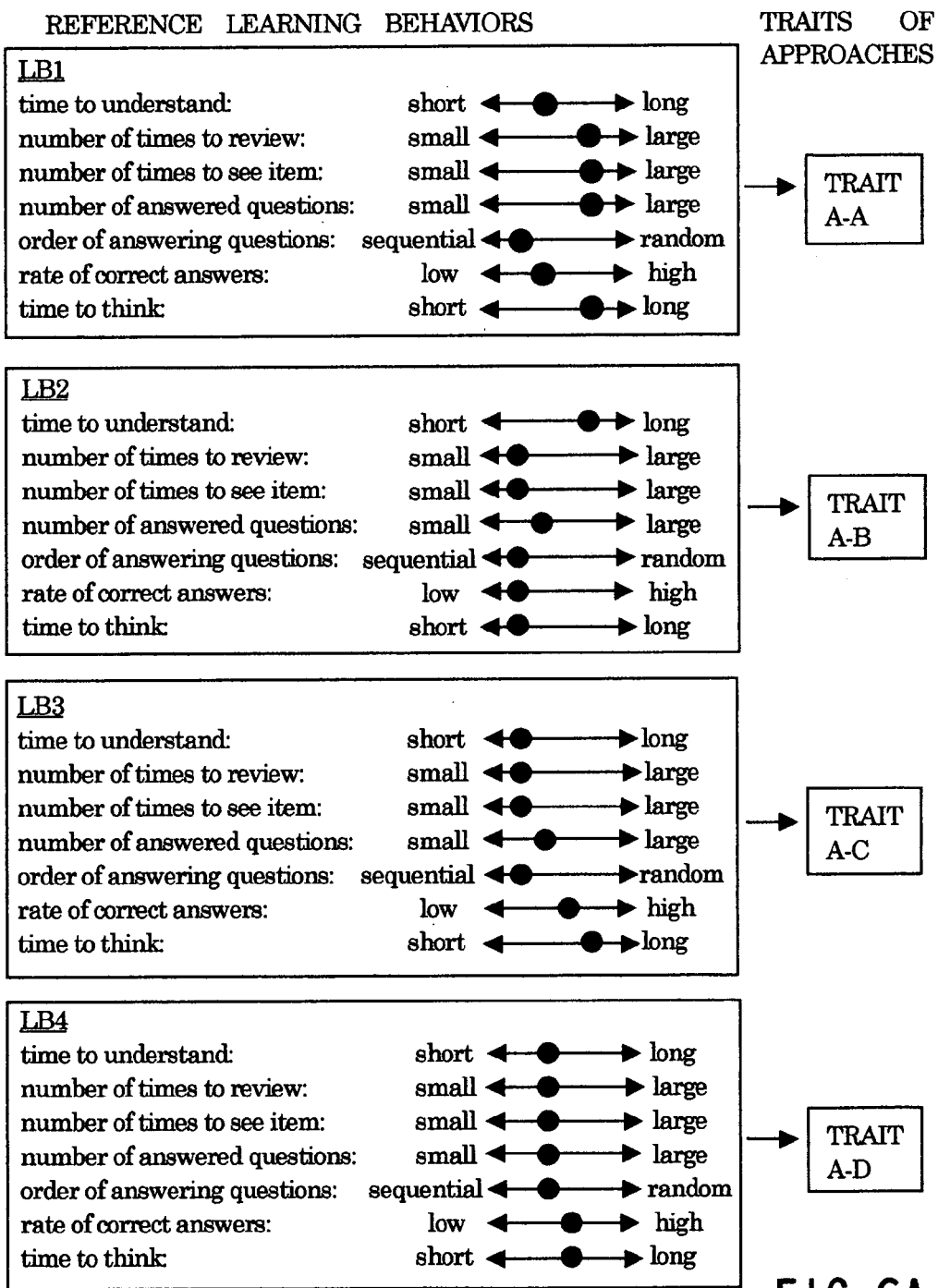
FIGS. 6A and 6B show an exemplary set of reference learning behaviors in different aspects that are associated with respective traits of approaches to learning and problem solving.
Figure 6B:
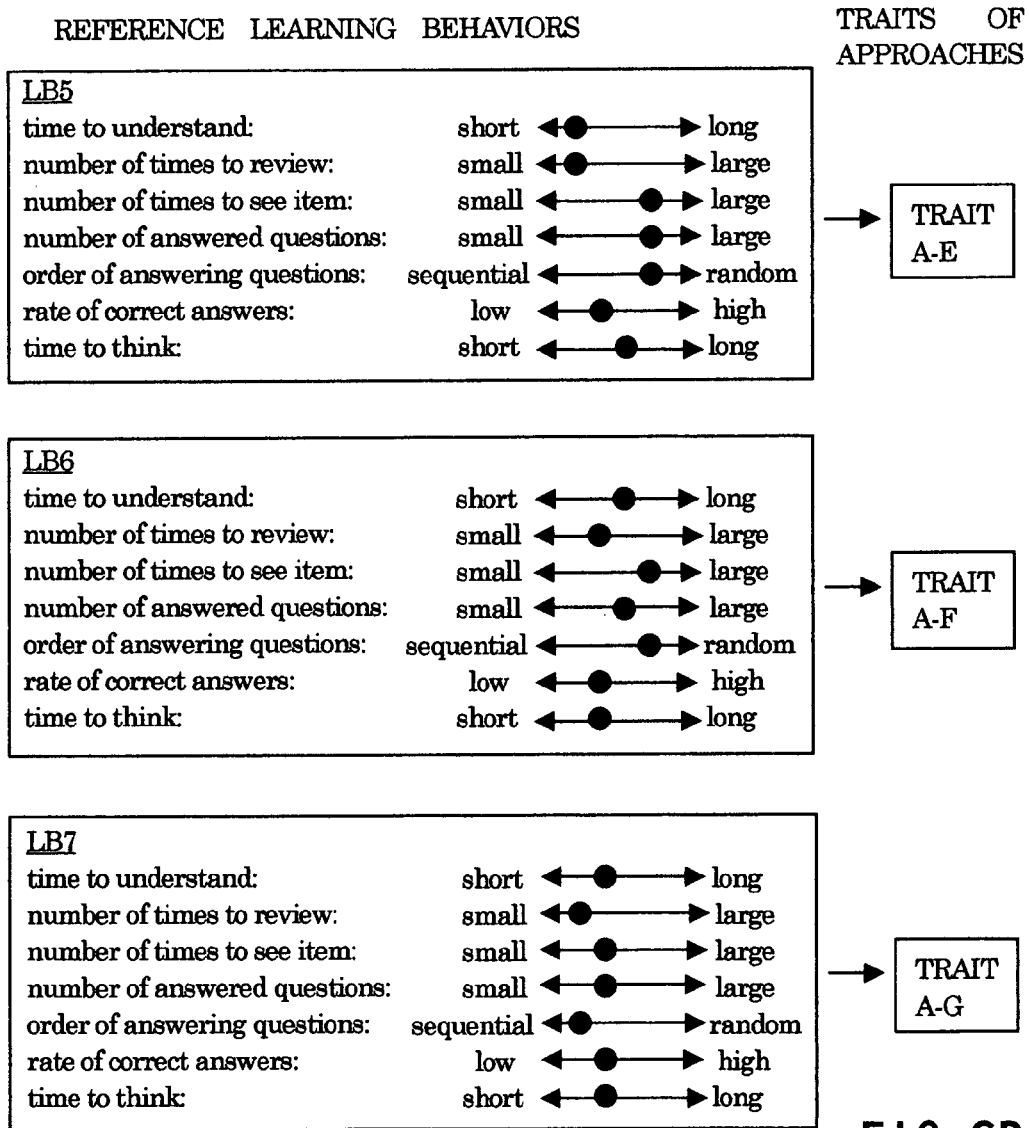

FIGS. 6A and 6B show an exemplary set of reference learning behaviors LB1 to LB7 in different aspects that are associated with the respective traits A-A to A-G of approaches to learning and problem solving. The aspects may be time required to understand a matter, the number of times to review a previous matter, the number of times to see the same matter, the number of answered questions, order of answering questions, a rate of correct answers, and time to think of a matter, as described above. The monitored user's learning behavior during the learning process is classified to the closest one of the types of the reference learning behaviors and then is associated with one of the traits of approaches that is associated with that closest reference learning behavior.

For example, if the user, during the learning process, reviews a previous matter many times and repeatedly answer questions by repeatedly reviewing the explanation until his or her answers to all questions become correct, the user's learning behavior may be associated with the trait A-A. For example, when the user encounters a difficult matter or problem during the learning process and the user terminates the learning without sufficiently understanding the matter, the user's learning behavior may be associated with the trait A-B. For example, when the user encounters a difficult matter or problem during the learning process and the user spends a long time for the matter without doing anything, the user's learning behavior may be associated with the trait A-C.

At Step 310, the presentation pattern redeterminer 120 modifies a subsequent teaching material presentation pattern for the user in accordance with the determined trait of approach to learning and problem solving, and stores the modified presentation pattern in the user's learning history database 126 at Step 312.

For example, when user's learning behavior is associated with the trait A-B, the difficulty scale of the teaching material presentation pattern may be modified from the magnitude 3 to the magnitude 2.

Figure 7:
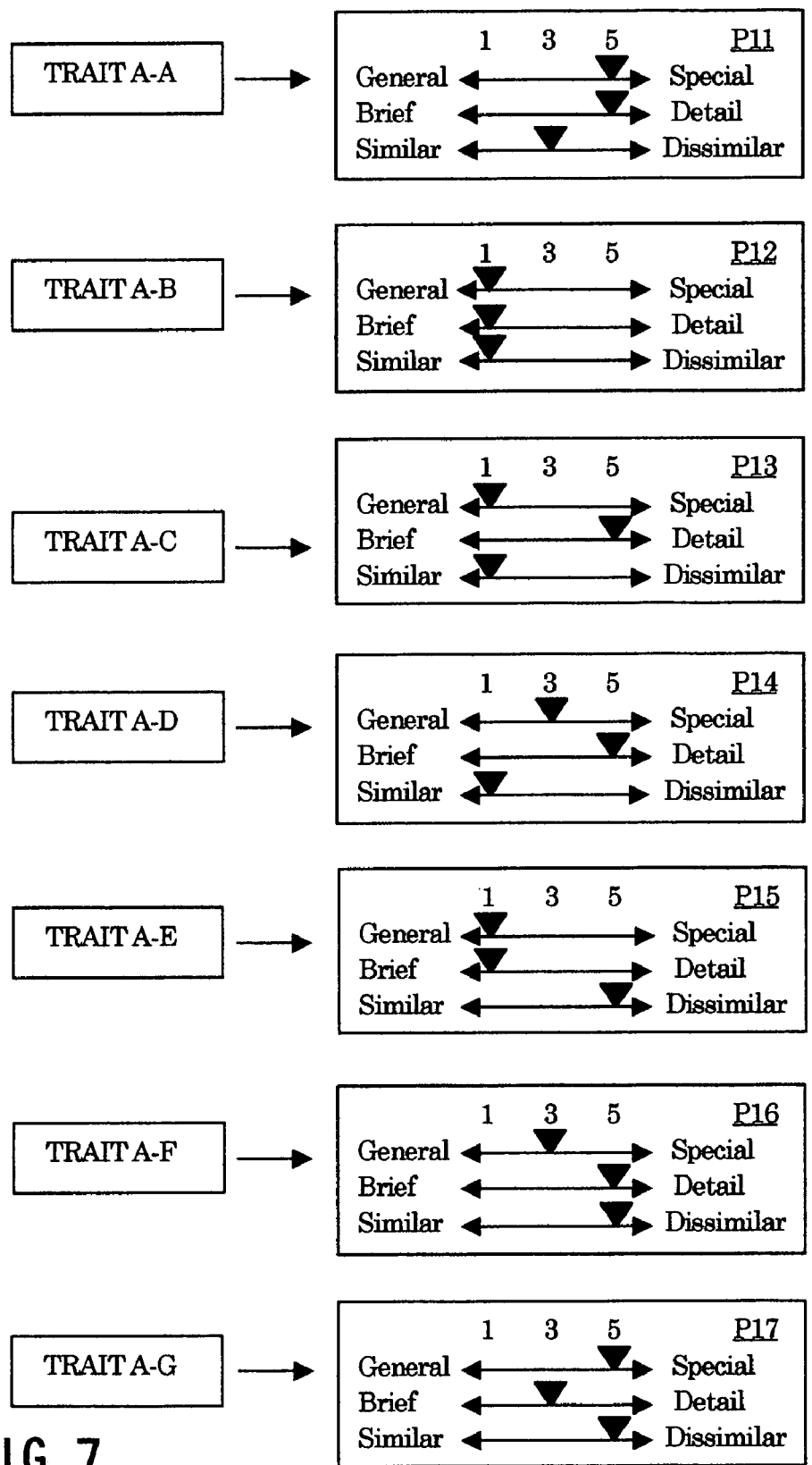
FIG. 7 shows association of a set of traits of the learners' approaches to learning and problem solving with another set of presentation patterns of teaching materials.

Alternatively, the teaching material presentation pattern may be modified in accordance with the association shown in FIG. 7, which shows association of traits A-A to A-G of learners' approaches to learning and problem solving with another set of presentation patterns P11 to P17 of teaching materials.

The material presentation processor 114 then retrieves the modified teaching material presentation pattern from the learning history database 126 at Step 302 which iterates for the next learning unit or possibly the same learning unit. The material presentation processor 114 then selects and edits some of the plurality of video clips in the teaching material database 122 in accordance with the modified presentation pattern, forms another teaching material module, and presents the other teaching material module to the client 130 of the user in accordance with the modified presentation pattern.

Thus the process of Steps 302 to 312 is performed for each one of the plurality of small learning units for one study subject which may consists of twelve sessions for example. Thus, during the learning process in the subject and within one session of the subject, the teaching material presentation pattern can be adaptively modified. However, as long as the user's trait of approach of learning and problem solving does not change during the learning process, the modification is not required. Thus, the user can learn the subject effectively in an optimal manner, and the number of learners who may drop the subjects can be minimized.

Experiment

Next, a control experiment conducted in accordance with the embodiment of the present invention is described below. Subjects for this experiment were twenty male and female students of ages 18 to 22 who majored in economics and management, and were divided into a group A of ten students who uses different adapted presentation patterns and a controlling group B of ten students who uses a common presentation pattern for comparison.

First, the groups A and B of students had the tests for the Y-G personality traits and general life attitude traits. The general life attitude trait attitude test included fifty-five questions and their answers were evaluated at the five magnitudes in terms of fitness to the trait factors.

In accordance with the associations of FIGS. 3 and 4, the personality traits and general life attitude traits of the group A of students were associated with their teaching material presentation patterns. An appropriate common teaching material presentation pattern was determined for the group B of ten students, independently of their personality traits and general life attitude traits and of the presentation patterns of the embodiment.

In this experiment, they learned the method and meaning of operating the computer simulation program "Stella" for marine biology as a study subject.

The group A of students, who were classified into the types of the five general life attitude traits, learned the subject on display screens of personal computers via the Web for 30 minutes, in which the teaching materials in the presentation patterns associated with each trait were presented to the students of that trait. The teaching materials in the appropriate common presentation pattern were presented similarly to the group B of students. Five video clips of about three to five minutes were combined as teaching materials for the learning. The total time of video clips was twenty minutes in net.

The groups A and B of students took a comprehension test of fifty questions before the learning in order to obtain controlling data of the students for comparison. Each question asked whether each statement was true (T) or false (F).

The video clips in the presentation patterns as described below were presented to the students of the group A, and their learning processes were monitored. The students of the trait L-A viewed basic video clips presented to them. In this case, when the students understood the current video clip, they were allowed to proceed to the next video clip. The students of trait L-B viewed outline video clips presented to them. In this case, the presented video clips developed centering around outlines, a possible way of learning was restricted, change to another way of learning was prohibited, and the contents of the teaching materials were presented in order. The students of trait L-C viewed the outline video clips presented to them. In this case, the students were allowed to learn sections of the outline fast. The students of trait L-D viewed the basic video clips presented to them. In this case, the students were allowed to review the learned matters even while the basic video clip was presented. The students of trait L-E first viewed an outline video clip presented to them. In this case, the students were allowed to arbitrarily select a plurality of basic video clips.

Finally, the groups A and B of students took the same comprehension test of the fifty questions. The average score of the test for the group A before the learning was 46.5 points. The average score of the test for the group B before the learning was 45.5 points. Thus, there was no significant difference between the average scores of the two groups. However, the average score of the test for the group A after the learning was 77.6. The average score of the test for the group B after the learning was 69.9. Thus, there was a significant difference between the average scores of the two groups, and hence the learning in accordance with the embodiment was very efficient. By further monitoring the learning processes of the students to modify the teaching material presentation patterns, the learning can be more efficient.

Figure 8:
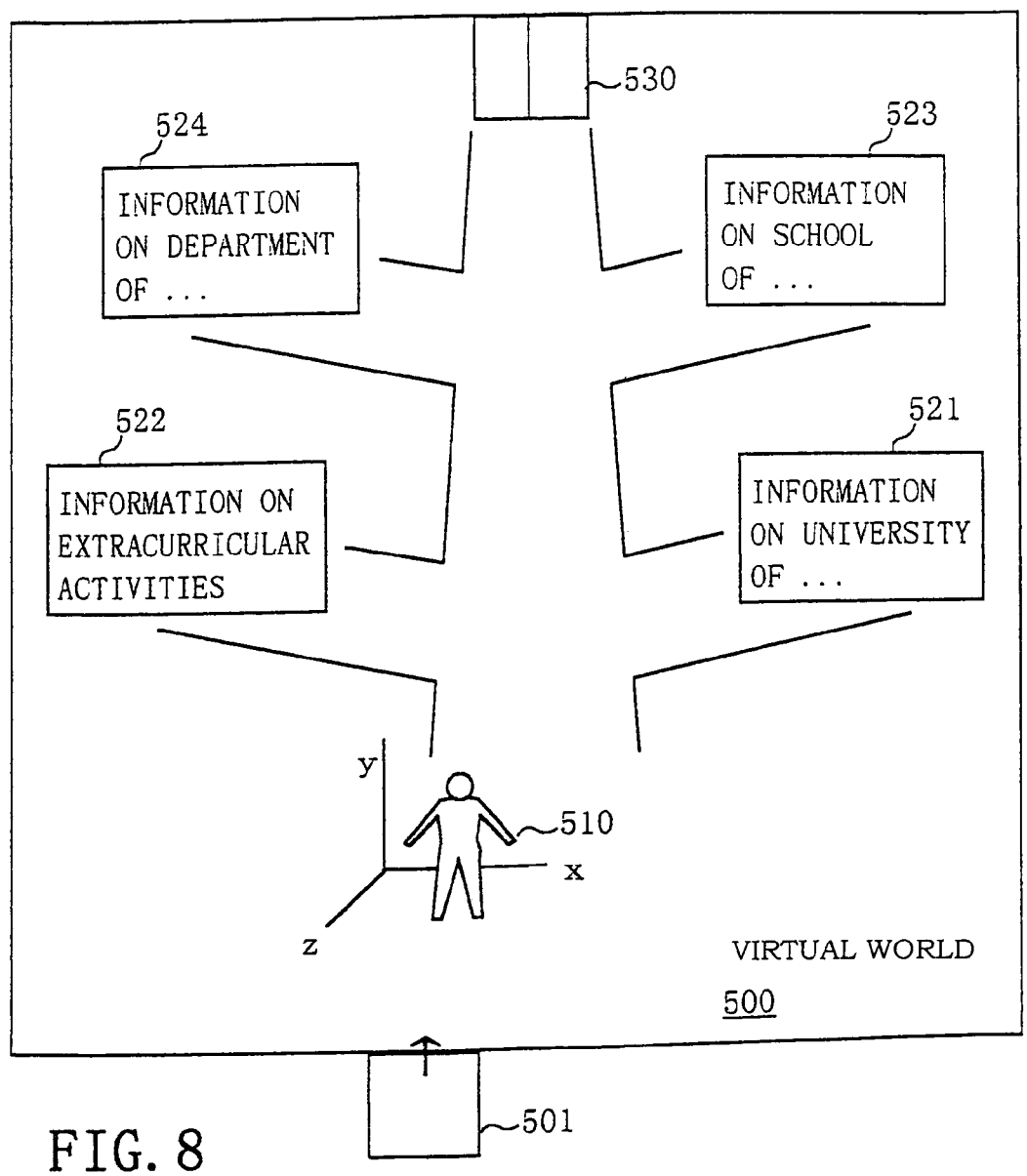
FIG. 8 illustrates an example of a three-dimensional virtual world for personality trait analysis displayed on a video monitor of a client, in accordance with another embodiment of the invention.

In the embodiment above described, the questionnaires are used to analyze the personality trait of the user, in accordance with the flowchart shown in FIG. 2. Alternatively, the personality trait of the user may be determined by analyzing actions of an avatar of the user in a two- or three-dimensional virtual world on the video monitor 134 of the client 130. FIG. 8 illustrates an example of such a three-dimensional virtual world 500 for personality trait analysis. In the virtual world 500, information displaying objects are arranged for the personality trait analysis. An avatar 510 of the user can be controlled to act in the virtual world 500 by the user, and the actions of the avatar 510 are recorded in an action recording file for analysis. The analysis of the avatar's action in such a virtual world is disclosed in detail in co-pending U.S. patent application Ser. No. 09/840,151, filed by Yoshiko Akazawa and Osamu Iemoto on Apr. 24, 2001, the title of the invention being "APPARATUS AND METHOD FOR PROVIDING VIRTUAL WORLD CUSTOMIZED FOR USER", which is incorporated herein by reference.

The virtual world 500 represents a reception room which has an entrance 501 and an entrance 530 to a virtual school building (not shown) having classrooms inside. The virtual reception room 500 is designed such that the avatar 510 of the user passes through the reception room 500 before registering a study subject and starting the learning process in the building behind the entrance 530.

The reception room 500 has different booths 521 through 523 having a plurality of pieces of information for the personality trait analysis of the user. For example, the booths 521, 522, 523, and 524 are provided for information on university, information on extracurricular activities, information on schools, and information on departments. The user controls his or her own avatar 510 to go and look at the different pieces of information in the booths 521 to 524, respond to them, and enter the building through the entrance 530 to register the subject and start the learning process.

The server 100 records the response and behavior of the avatar 510 in the booths 521 to 524 in the reception room 500, and analyzes the record to determine the personality trait and general life attitude trait of the user when the avatar 510 passes through the entrance 530.

The above-described embodiments are only typical examples, and their modifications and variations are obvious to those skilled in the art. It should be understood that those skilled in the art can make various modifications to above-described embodiments without departing from the principle of the invention and from the scope of the invention defined by the accompanying claims.

What is claimed is:

1. An information processing apparatus, comprising:
a memory having a first memory area for storing a plurality of teaching material elements including text, video and/or audio data, and having a second memory area for storing teaching material presentation patterns;
first processor for providing a questionnaire to a user and analyzing an answer to said questionnaire to determine a trait of said user related to personality in accordance with magnitudes in a plurality of scales associated with learning behavior of said user, and for determining a teaching material presentation pattern for said user in accordance with said determined trait of said user and storing the determined teaching material presentation pattern in said second memory area;
second processor for retrieving said teaching material presentation pattern for said user from said second memory area, selecting and editing ones of a plurality of teaching material elements of a specific subject in said first memory area in accordance with said teaching material presentation pattern to generate a teaching material module, and presenting said teaching material module to said user in accordance with said teaching material presentation pattern; and
third processor for analyzing learning behavior of said user during a learning process of said user using said presented teaching material module in accordance with said teaching material presentation pattern, dynamically modifying said teaching material presentation pattern based on the trait and the learning behavior of said user and storing said modified presentation pattern in said second memory area.

2. The information processing apparatus according to claim 1, wherein said second processor further retrieves said modified teaching material presentation pattern for said user from said second memory area, selects and edits ones of said plurality of teaching material elements of said specific subject in said first memory area in accordance with said modified presentation pattern to generate another teaching material module, and presents said other teaching material module to said user in accordance with said modified presentation pattern.

3. The information processing apparatus according to claim 1, wherein said third processor stores a record of said learning behavior of said user in said second memory area, and analyzes said stored record of the learning behavior of said user.

4. The information processing apparatus according to claim 1, wherein said teaching material presentation pattern defines specific magnitudes related to difficulty, required time and dissimilarity of the teaching material elements.

5. The information processing apparatus according to claim 1, wherein said questionnaire comprises first and second portions, and said second portion of said questionnaire is determined depending on an answer to said first portion of said questionnaire, and is provided after said first portion of said questionnaire is provided.

6. The information processing apparatus according to claim 1, wherein said first processor analyzes the answer to said questionnaire to further determine a trait of said user related to general life attitude.

7. The information processing apparatus according to claim 6, wherein said first processor determines said trait of said user related to learning attitude in accordance with said personality trait and said trait of general life attitude.

8. The information processing apparatus according to claim 1, wherein said teaching material element is a video clip.

9. The information processing apparatus according to claim 1 being connected to an information processing terminal over a network for providing said questionnaire and said teaching material module to said information processing terminal.

10. A program stored in a recording medium for use in an information processing apparatus, said information processing apparatus comprising a memory and a processor, said memory having a first memory area for storing a plurality of teaching material elements including text, video and/or audio data, and having a second memory area for storing a teaching material presentation pattern, said program enabling said processor to perform:
  providing a questionnaire to a user and analyzing an answer to said questionnaire to determine a trait of said user related to personality in accordance with magnitudes in a plurality of scales associated with learning behavior of said user;
  determining a teaching material presentation pattern for said user in accordance with said determined trait of said user and storing the determined teaching material presentation pattern in said second memory area;
  retrieving said teaching material presentation pattern for said user from said second memory area, selecting and editing ones of a plurality of teaching material elements of a specific subject in said first memory area in accordance with said teaching material presentation pattern to generate a teaching material module, and presenting said teaching material module to said user in accordance with said teaching material presentation pattern; and
  analyzing learning behavior of said user during a learning process of said user using said presented teaching material module in accordance with said teaching material presentation pattern, dynamically modifying said teaching material presentation pattern based on the trait and the learning behavior of said user and storing said modified presentation pattern in said second memory area.

11. The program according to claim 10 further enabling said processor to retrieve said modified teaching material presentation pattern for said user from said second memory area, selecting and editing ones of said plurality of teaching material elements of said specific subject in said first memory area in accordance with said modified presentation pattern to generate another teaching material module, and presenting said other teaching material module to said user in accordance with said modified presentation pattern.

12. The program according to claim 10, further enabling said processor to store a record of said learning behavior of said user during the learning process of said user using said presented teaching material module of the specific subject in accordance with said teaching material presentation pattern in said second memory area, wherein analysis of learning behavior comprises analyzing said stored record of the learning behavior of said user.

13. The program according to claim 10, wherein said teaching material presentation pattern defines specific magnitudes related to difficulty, required time and dissimilarity of the teaching material elements.

14. The program according to claim 10, wherein said questionnaire comprises first and second portions, and said second portion of said questionnaire is determined depending on an answer to said first portion of said questionnaire, and is provided after said first portion of said questionnaire is provided.

15. The program according to claim 10, wherein providing a questionnaire and determining a trait comprises analyzing the answer to said questionnaire to further determine a trait of said user related to general life attitude.

16. The program according to claim 15, wherein providing a questionnaire and determining a trait comprises determining said trait of said user related to learning attitude in accordance with said personality trait and said trait of general life attitude.

17. The program according to claim 10, wherein said teaching material element is a video clip.

18. The program according to claim 10, wherein said information processing apparatus is connected to an information processing terminal over a network, and said questionnaire and said teaching material module are provided to said information processing terminal.

19. A method for adaptively presenting to a user a teaching material using a computer-implemented education system which presents to the user a plurality of teaching material elements including text, video$_1$ and/or audio data, said method comprising:
  providing a questionnaire to a user and analyzing an answer to said questionnaire to determine a trait of said user related to personality in accordance with magnitudes in a plurality of scales associated with learning behavior of said user;
  determining a teaching material presentation pattern for said user in accordance with the trait of said user;
  selecting and editing ones of a plurality of teaching material elements of a specific subject in accordance with said teaching material presentation pattern for said user to generate a teaching material module, and presenting said teaching material module to said user in accordance with said teaching material presentation pattern; and
  analyzing learning behavior of said user via the computer-implemented education system during a learning process of said user using said presented teaching material module and dynamically modifying said teaching material presentation pattern based on the trait and the learning behavior of said user.

20. The method according to claim 19, further comprising:
  retrieving said modified teaching material presentation pattern for said user from said second memory area, selecting and editing ones of said plurality of teaching material elements of said specific subject in said first memory area in accordance with said modified presentation pattern to generate another teaching material module, and presenting said other teaching material module to said user in accordance with said modified presentation pattern.

21. The method according to claim 19, wherein said teaching material presentation pattern defines specific magnitudes related to difficulty, required time and dissimilarity of the teaching materials.

22. The method according to claim 19, wherein providing a questionnaire and determining a trait comprises analyzing the answer to said questionnaire to further determine a trait of said user related to general life attitude.

23. The method according to claim 19, wherein said teaching material module presented to said user is provided to en information processing terminal of said user.

24. A computer-assisted education method for adaptively presenting teaching materials to a user, comprising:
- presenting teaching materials based on information related to traits of the user, the traits being determined in accordance with magnitudes in a plurality of scales associated with learning behavior of the user; and
- analyzing learning behavior of the user during a learning process, wherein the teaching materials are dynamically modified based on the trait and the learning behavior of the user and presented to the user.

25. A computer-assisted education system for adaptively presenting teaching materials to a user, comprising:
- a processor for providing a questionnaire to a user;
- an input device for receiving a response to the questionnaire from the user based on which the processor determines a trait of the user related to personality in accordance with magnitudes in a plurality of scales associated with learning behavior of the user, and determines a teaching material presentation pattern for the user;
- a storage device for storing the determined teaching material presentation pattern of the user; and
- a display unit to present a teaching material to the user in accordance with the determined teaching material presentation pattern, wherein the processor analyzes learning behavior of the user during a learning process, dynamically modifies the teaching material presentation pattern based on the trait and the learning behavior of the user, stores the modified presentation in the storage device.

26. A method for adaptively presenting a teaching material to a user using a computer-implemented education system, comprising:
- analyzing a learning behavior of the user based on a response to a questionnaire provided to the user, the response to the questionnaire being used to determine a trait of the user related to personality and a teaching material presentation pattern for the user; and
- presenting a teaching material to the user in accordance with the determined teaching material presentation pattern determined based on the trait of said user and further analyzing the learning behavior of the user during a learning process for dynamic modification of the teaching material presentation pattern and presenting the teaching material accordingly, where the trait of the user is determined in accordance with magnitudes in a plurality of scales associated with learning behavior of the user.

27. A computer-implemented education method for presenting a teaching material to a user, comprising:
- providing a teaching material having a first content to the user based on traits of the user, the traits being determined based on magnitudes in a plurality of scales associated with learning behavior of the user and responses to a questionnaire provided to the user; and
- analyzing learning behavior of the user while the teaching material having the first content is being provided to the user for determining teaching material presentation pattern of the user and dynamically changing the teaching material presentation pattern based on the analysis to generate a teaching material having a second content.

* * * * *

UNITED STATES PATENT AND TRADEMARK OFFICE
CERTIFICATE OF CORRECTION

| | | |
|---|---|---|
| PATENT NO. | : 7,110,989 B2 | Page 1 of 1 |
| APPLICATION NO. | : 09/866647 | |
| DATED | : September 19, 2006 | |
| INVENTOR(S) | : Osamu Iemoto et al. | |

It is certified that error appears in the above-identified patent and that said Letters Patent is hereby corrected as shown below:

First Page, Column 1 Item (75) (Inventors), Line 1-4, after "Iemoto," change "c/o Fujitsu Limited 1-1, Kamikodanaka 4-chome, nakahara-ku, Kawasaki-shi, Kanagawa, 211-8588 (JP);" to --Higashiosaka-shi, (JP);--.

First Page, Column 2 Item (56) (Other Publications), Line 1, change "et al;" to --et al.;--.

Column 15, Line 13, after "claim 1" insert --,--.

Column 15, Line 51, after "claim 10" insert --,--.

Column 16, Line 30, change "$video_1$" to --video,--.

Column 17, Line 7, change "en" to --an--.

Signed and Sealed this

Fifteenth Day of May, 2007

JON W. DUDAS
*Director of the United States Patent and Trademark Office*